United States Patent
Sakata et al.

(10) Patent No.: US 7,415,842 B2
(45) Date of Patent: Aug. 26, 2008

(54) OPTICAL GLASS ELEMENT AND MANUFACTURING METHOD THEREOF

(75) Inventors: Tadafumi Sakata, Kobe (JP); Tadashi Sugiyama, Hachioji (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 385 days.

(21) Appl. No.: 10/940,942

(22) Filed: Sep. 14, 2004

(65) Prior Publication Data

US 2005/0247081 A1   Nov. 10, 2005

(30) Foreign Application Priority Data

May 10, 2004   (JP) ............... 2004-139674

(51) Int. Cl.
*C03B 23/00* (2006.01)
*C03B 11/00* (2006.01)

(52) U.S. Cl. ............... 65/64; 65/102; 65/127; 65/305

(58) Field of Classification Search ............ 65/63, 65/64, 65, 66, 275, 126, 127, 303, 102, 227, 65/244, 305
See application file for complete search history.

(56) References Cited

U.S. PATENT DOCUMENTS

| | | | | |
|---|---|---|---|---|
| 4,629,487 A | * | 12/1986 | Monji et al. ............ 65/26 |
| 5,662,999 A | * | 9/1997 | Taniguchi et al. ........ 428/408 |
| 5,762,673 A | * | 6/1998 | Hirota et al. ............ 65/25.1 |
| 5,873,921 A | * | 2/1999 | Hirota et al. ............ 65/25.1 |
| 6,070,436 A | * | 6/2000 | Hirota et al. ............ 65/64 |
| 6,560,994 B1 | * | 5/2003 | Hirota ............ 65/24 |
| 2003/0211929 A1 | * | 11/2003 | Hayashi et al. ............ 501/78 |

FOREIGN PATENT DOCUMENTS

| | | |
|---|---|---|
| JP | 63-151632 A | 6/1988 |
| JP | 06-263462 A | 9/1994 |
| JP | 8-208246 A | 8/1996 |

OTHER PUBLICATIONS

PCT "International Search Report", dated Jun. 28, 2005, for counterpart International Patent Application No. PCT/JP/2005/008186.

* cited by examiner

*Primary Examiner*—Steven P. Griffin
*Assistant Examiner*—DeMaris R. Wilson
(74) *Attorney, Agent, or Firm*—Sidley Austin LLP (57) ABSTRACT

The present invention relates to a manufacturing method for an optical glass element, in which molten glass 9 is pressed between a lower mold 1 and an upper mold 8, and the pressing process is carried out while maintaining a space 10 between a border area (5, 6) of a molding face 2 belonging to the lower mold 1 and a circumferential face 3 located on the periphery thereof and glass 9, and an optical glass element manufactured by such a method.

15 Claims, 6 Drawing Sheets

OPTICAL GLASS ELEMENT AND MANUFACTURING METHOD THEREOF

This application is based on application(s) No. 2004-139674 filed in Japan, the contents of which are hereby incorporated by reference.

BACKGROUND OF THE INVENTION

1. Field of the Invention

The present invention relates to an optical glass element, more specifically a micro-optical glass element such as an optical-communication-use coupling lens, an optical pickup lens and an endoscope-use lens, and a manufacturing method for such a lens.

2. Description of the Related Art

Figure 7:
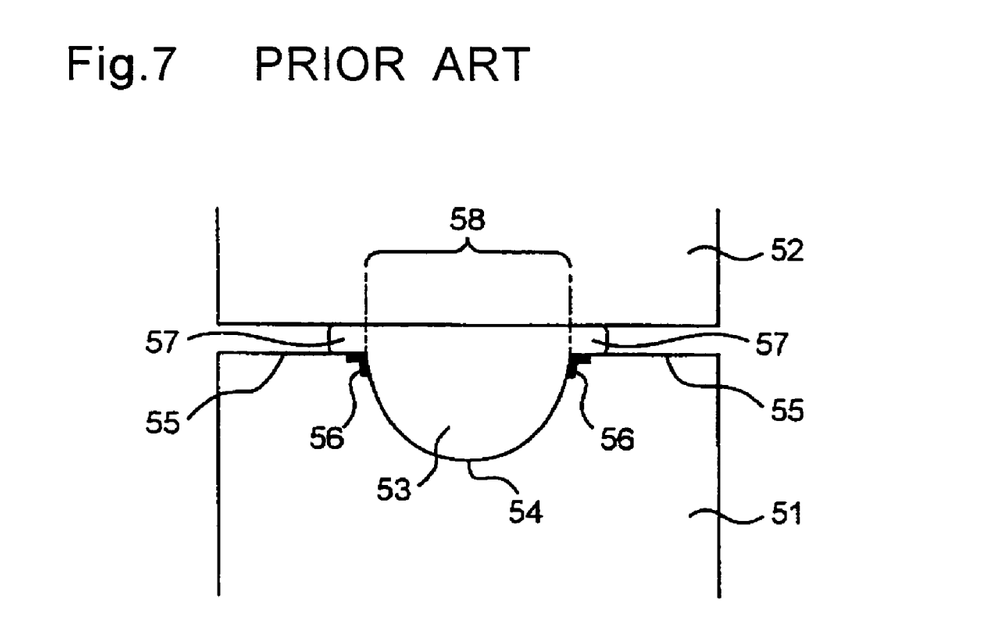
FIG. 7 is a schematic cross-sectional view that shows a pressing process in the conventional technique.

In recent years, in the field of compact cameras, VTR cameras, optical pickup lenses used for DVDs and the like, micro-optical glass elements, molded into predetermined shapes, have been utilized in order to achieve a small size, high precision and environment resistance. In order to manufacture such a micro-optical glass element, as shown in FIG. 7, a method in which, after molten glass 53 has been directly dropped onto a heated lower mold 51, this is pressed between the lower mold 51 and an upper mold 52 has been often used. In particular, during the press-molding process, a border area 56 between a molding face 54 belonging to the lower mold 51 and its circumferential face 55 is generally made in contact with glass 53. In general, the optical glass element has an edge portion 57 around a lens portion 58, which is formed from the constraint in the manufacturing process.

There arises a problem that in the case when a lens is manufactured through this method, however, chips and cracks tend to occur on the border between the lens portion and the edge portion. Presumably, this problem is caused by the fact that, since the thickness of the edge portion is generally thinner than the lens portion, there is a difference in shrinkage of glass between the lens portion and the edge portion in a glass cooling process upon press-forming the lens. More specifically, since the amount of shrinkage of the edge portion is smaller than the amount of shrinkage of the lens portion, the pressure to be received by the edge portion increases when a pressure is continuously applied to the glass in a manner so as to allow the mold to follow the shrinkage of glass in the lens portion. As a result, a stress is concentrated on the border between the lens portion and the edge portion to cause chips and cracks. This problem becomes more conspicuous in the case when a lens in which the thickness of the edge portion is extremely smaller than the center thickness of the lens, that is, a so-called convex lens, is manufactured. In contrast, in the case when a pressure is applied to the glass in a manner so as to allow the mold to follow the shrinkage of glass in the edge portion, the molding surface is not preferably transferred onto the lens portion.

In order to solve these problems, a technique in which a chamfered portion is formed on the border portion between the processing curved portion and plane portion of the mold (for example, see Japanese Patent Application Publication No. 3-52417 (Japanese Patent Laid-Open No. 63-151632)) has been proposed. In this technique, however, since time-consuming tasks including the chamfering process added to the mold-forming process are required and since the grindstone is more susceptible to abrasion depending on the amount of chamfered portion, there is an increase in the manufacturing costs of the mold.

Another technique has been proposed in which the border portion between the processing curved portion and the plane portion is formed into an R-curved shape so as to prevent cracks in the lens (for example, see Japanese Patent Application Laid-Open No. 6-263462). However, this technique also causes problems in that time-consuming tasks are required in the mold-forming process, in that the manufacturing costs of the mold increase and in that it is impossible to simultaneously process the mold-processing face and the edge portion.

SUMMARY OF THE INVENTION

The objective of the present invention is to provide a manufacturing method which provides an optical glass element to which a molding surface has been desirably transferred, without causing any chips and cracks, without the necessity of adding special machining processes to the mold, and an optical glass element manufactured by such a method.

The present invention provides a manufacturing method for an optical glass element in which molten glass is pressed between a lower mold and an upper mold, characterized in that a pressing process is carried out while maintaining a space between a border area of a molding face and a circumferential face located on the periphery thereof in the lower mold and the glass, and an optical glass element manufactured through such a method.

In accordance with the method of the present invention, it becomes possible to manufacture an optical glass element that is free from chips and cracks and has a face on which a molding surface is desirably transferred, at low costs, without the necessity of any special machining processes to be applied to the mold.

DETAILED DESCRIPTION OF THE INVENTION

The present invention provides a manufacturing method for an optical glass element in which molten glass is pressed between a lower mold and an upper mold, characterized in that a pressing process is carried out while maintaining a space between a border area of a molding face and a circumferential face located on the periphery thereof in the lower mold and the glass, and an optical glass element manufactured through such a method.

In accordance with the method of the present invention, it becomes possible to manufacture an optical glass element that is free from chips and cracks and has a face on which a molding surface is desirably transferred, at low costs, without the necessity of any special machining processes to be applied to the mold.

Figure 4A:
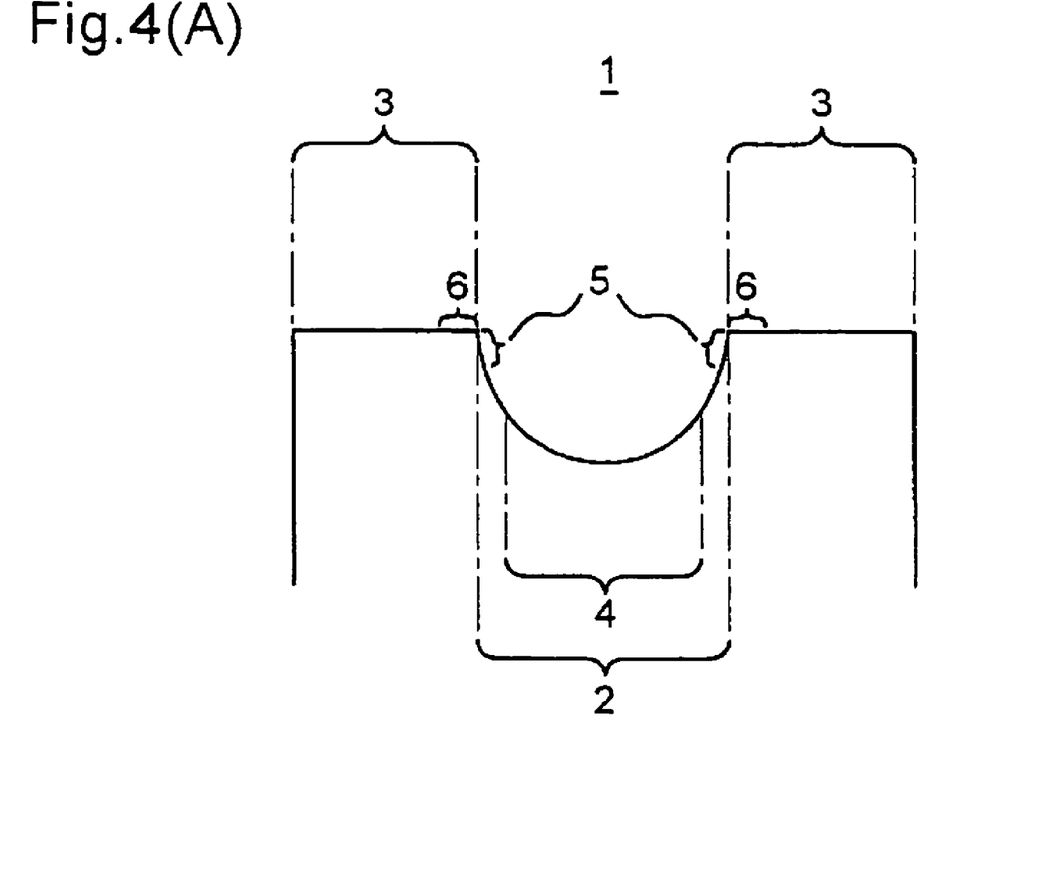
FIG. 4(A) is an enlarged cross-sectional view of a lower mold that explains the lower mold.

The manufacturing method for an optical glass element in accordance with the present invention is characterized in that, upon pressing molten glass between a lower mold and an upper mold, a pressing process is carried out while maintaining a space between a border area of a molding face belonging to the lower mold and a circumferential face located on the periphery thereof and the glass. As shown in an enlarged cross-sectional view of the lower mold of FIG. 4(A), the border area between the molding face and its circumferential face is defined as both of, or either of an outer edge area 5 in a molding face 2 of a lower mold 1 with the border line along the circumferential face 3 as its one edge and an inner edge area 6 in the circumferential face 3 of the lower mold 1 with the border line along the molding face 2 as its one edge. The following description will discuss the present invention in detail by reference to Figures; and in FIGS. 1 to 6, the same parts, faces, portions and areas are indicated by the same reference numerals. In FIG. 4(A), reference numeral "4" represents an optical effective area in the molding face 2.

(First Embodiment)

Figure 1A:
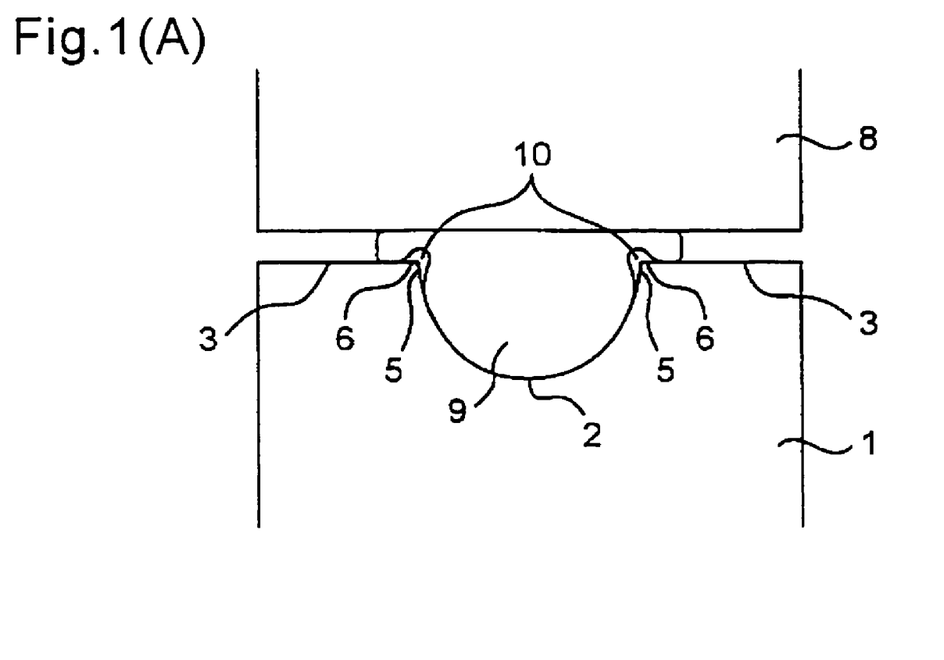
FIG. 1(A) is a schematic cross-sectional view that shows a pressing process in the first embodiment.
Figure 1B:
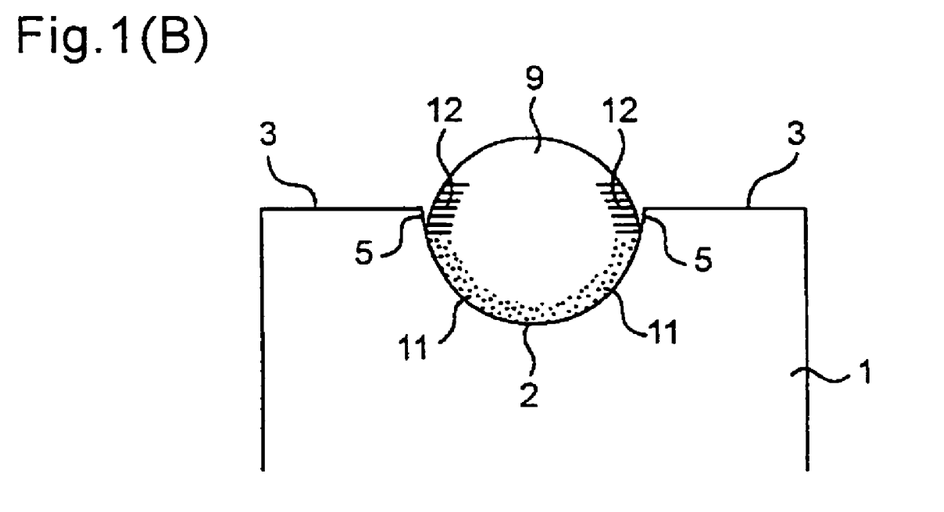
FIG. 1(B) is a schematic cross-sectional view that shows a holding state of dropped glass prior to the pressing process of FIG. 1(A)

As shown in FIG. 1(A), in the first embodiment of the present invention, a pressing process is carried out while maintaining a space 10 between a border area of the molding face 2 and the circumferential face 3 in the lower mold 1 and glass 9. More specifically, the pressing process is carried out while continuously maintaining the space 10 through the entire circumference, between the outer edge area 5 in the molding face 2 (see FIG. 4(A)) as well as the inner edge area 6 in the circumferential face 3 (see FIG. 4(A)) and the glass 9. The mechanism by which the space is maintained upon pressing so that the objective of the present invention is achieved may be explained as follows: As shown in FIG. 1(B), molten glass 9, dropped onto the lower mold 1, is cooled starting from a contact portion 11 with the lower mold 1. For this reason, of the non-contact portion of the dropped molten glass 9 to the molding face 2, the portion closest to the contact portion to the lower mold, that is, the portion close to the border between the molding face 2 and the circumferential face 3 of the lower mold (portion near the border) 12, is more susceptible to cooling in comparison with the other non-contact portions, and tends to have a reduction in the fluidity of glass. For this reason, when, after the dropping process of the molten glass, the glass is maintained for a predetermined period of time, the fluidity in the portion near the border 12 is properly lowered, while the other non-contact portions are allowed to maintain a comparatively high fluidity. When the pressing process is carried out in this state, based upon a difference in the fluidity between the portion near the border and the other non-contact portions, the portion near the border 12 is deformed in a manner so as to form an arch in accordance with the deformation in the other non-contact portions so that the space 10 as shown in FIG. 1(A) is formed. When the pressing process is carried out while maintaining such a space, a concave section (groove) derived from the space is formed in the glass on the border between the lens face on which the lower-molding surface is transferred and the edge face on which the-lower-mold circumferential face is transferred. It is considered that in the present invention, since such a concave section is formed, a stress, which has been conventionally concentrated on the border between the lens face and the edge face upon pressing, is dispersed over the entire surface of the concave section, with the result that it becomes possible to suppress occurrence of chips and cracks. When chips and cracks are suppressed in this manner, it becomes possible to effectively apply a pressure on the glass in a manner so as to allow the mold to follow the glass shrinkage of the lens portion, and consequently to desirably transfer the molding surface onto the glass.

With respect to the size of the space 10 to be formed at the time of pressing, not particularly limited as long as the objective of the present invention is achieved, it is normally dependent on the quantity of use of the molten glass. For example, when 10 to 200 mg of molten glass is used, the opening height and the depth of the space, when the space 10 is viewed from the border side between the lower-mold molding face 2 and the circumferential face 3, are in a nanometer to millimeter level in FIG. 1(A).

In the case when the space 10 is formed in contact with the optical effective area of the lower-mold molding face (see FIG. 4(A)), the concave section (groove) derived from the space is undesirably formed within the optical effective area of the resulting element; therefore, factors, such as the quantity of use of glass, optical effective diameter, mold temperature and glass viscosity, are appropriately adjusted so that the space is not made in contact with the optical effective area of the lower-mold molding face.

The quantity of use of molten glass is not intended to be limited by the above-mentioned range, and in the present invention, the quantity of use of molten glass is not particularly limited.

In order to carry out the press-molding process while maintaining the space as shown in FIG. 1(A), (1-1) the glass shape immediately before the pressing, (1-2) the timing of the pressing and (1-3) the pressing pressure are appropriately controlled as described below:

(1-1) The glass shape immediately before the pressing is set to such a shape that, as shown in FIG. 1(B), the outer edge area 5 of the lower-mold molding face is not made in contact with molten glass 9, and molten glass is dropped onto the lower mold so as to maintain such a shape immediately before the pressing process. Various conditions at the time of dropping are not particularly limited, as long as the above-mentioned shape is maintained immediately before the pressing; and in order to ensure the above-mentioned shape, for example, the viscosity of molten glass to be dropped, the lower-mold temperature and the wettability of the lower mold are adjusted properly.

(1a) Viscosity of Dropped Glass

When the viscosity of the molten glass to be dropped is too small (glass temperature is too high), glass adheres to the lower mold with the result that the glass reaches the border area of the molding face and the circumferential face in the lower mold so that the border portion in the glass is preliminarily formed, resulting in frequent occurrences of cracks. In contrast, when the viscosity of the dropped glass is too great, the glass is solidified in the course of the pressing process, resulting in cracks. Since the viscosity of molten glass to be dropped from the nozzle tip portion is determined depending on the quantity of dropped glass and the kinds of glass, it is not necessarily determined in a fixed manner. For example, when glass is LaK8 with a dropping quantity being set to 10 to 200 mg, the viscosity is appropriately selected, generally within a range from $10^1$ to $10^{10}$ poise, in particular, within a range from $10^3$ to $10^7$ poise. With respect to the viscosity, values measured through a rotary viscometer of an outer cylinder rotary type (ISO 7884-2) were used. More specifically, a crucible or an outer cylinder is rotated at a fixed speed, and a torque, generated due to a difference in angular velocity between the crucible and the spindle, is measured.

(1b) Lower Mold Temperature

When the lower mold temperature is too high, glass adheres to the lower mold with the result that the glass reaches the border area of the molding face and the circumferential face in the lower mold so that the border portion in the glass is preliminarily formed, resulting in frequent occurrences of cracks. In contrast, when the lower mold temperature is too low, the glass is abruptly cooled and solidified, resulting in occurrence of cracks in the course of the pressing process. Since the lower-mold temperature is determined depending on the kinds of glass and the quantity of dropping glass, it is not necessarily determined in a fixed manner. For example, when glass is LaK8 and a dropping quantity is set to 10 to 200 mg, the temperature is appropriately selected within a range from 300 to 700° C., in particular, within a range from 400 to 600° C.

(1c) Wettability of Lower Mold

The wettability of the lower mold represents wettability to glass, and when the wettability is too high, the glass tends to adhere to the lower mold, with the result that the glass reaches the border area of the molding face and the circumferential face in the lower mold so that the border portion in the glass is preliminarily formed. The wettability of the lower-mold molding face is appropriately selected from not less than 10 nm in the surface roughness Ra, in particular, within a range from 10 to 50 nm in Ra. The circumferential face of the lower mold and the contact face to glass of the upper mold are preferably allowed to have a wettability similar to that as described above. With respect to the surface roughness, values, obtained based upon JIS B0601-1994, are used.

(1-2) Timing in pressing refers to a waiting period of time from the receipt of molten glass in the lower mold to the start of the pressing process by using the lower mold and the upper mold. In the present embodiment, the waiting time refers to time required for the portion near the border 12 (see FIG. 1(B)), having an area that is wide enough to form a space between the outer edge area 5 of the molding face 2 as well as the inner edge area 6 of the circumferential face 3 and glass, to cause an appropriate reduction in the fluidity during the pressing process. In the case when the waiting time is too short, even if the glass shape immediately before the pressing is maintained as described above, the reduction in the fluidity in the portion near the border 12 is not sufficiently caused, with the result that the glass reaches the border area of the molding face and the circumferential face in the lower mold so that the border portion in the glass is preliminarily formed. The resulting problem is that cracks occur frequently. In the case when the waiting time is too long, since the fluidity is extremely reduced in the glass as a whole, it becomes difficult to transfer the molding surface onto the glass. Since the waiting time is determined depending on the kinds of glass, the quantity of dropped glass and the lower mold temperature, it is not necessarily determined in a fixed manner. For example, when glass is LaK8 and a dropping quantity is set to 10 to 200 mg, with the lower temperature being set within the above-mentioned range, the waiting time is appropriately selected, generally within a range from 3 to 10 seconds, in particular, within a range from 5 to 10 seconds.

(1-3) The pressing pressure is appropriately set in a range so as to desirably transfer the molding surface while maintaining the space. Since such a pressing-pressure range is dependent on the viscosity of glass, it is not necessarily determined in a fixed manner. For example, when the viscosity of the glass is set within the above-mentioned range, the pressing pressure is appropriately selected, generally from a range of 10 to 100 kg/cm$^2$, in particular, from a range of 10 to 50 kg/cm$^2$.

In FIG. 1(A), the contact face of the upper mold to glass is formed as a plane shape; however, the present invention is not intended to be limited by this shape, and for example, a concave-face shape or a convex-face shape may be used.

(Second Embodiment)

Figure 2A:
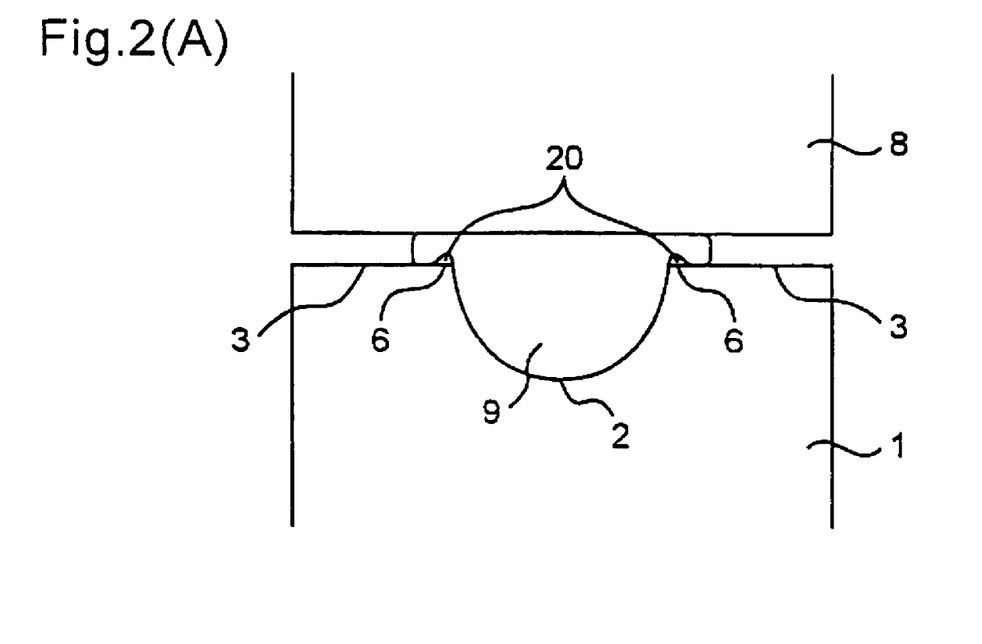
FIG. 2(A) is a schematic cross-sectional view that shows a pressing process in the second embodiment.

As shown in FIG. 2(A), in the second embodiment of the present invention, a pressing process is carried out while maintaining a space 20 between a border area of the molding face 2 and the circumferential face 3 in the lower mold 1 and glass 9. More specifically, the pressing process is carried out while maintaining the space 20 through the entire circumference, between the inner edge area 6 in the circumferential face 3 (see FIG. 4(A)) and the glass 9. The second embodiment is the same as the first embodiment except that the pressing process is carried out while maintaining the space 20 between the inner edge area 6 in the circumferential face 3 and the glass 9. In other words, the mechanism and the like by which the space is maintained upon pressing so that the objective of the present invention is achieved are the same as those of the first embodiment.

Figure 2B:
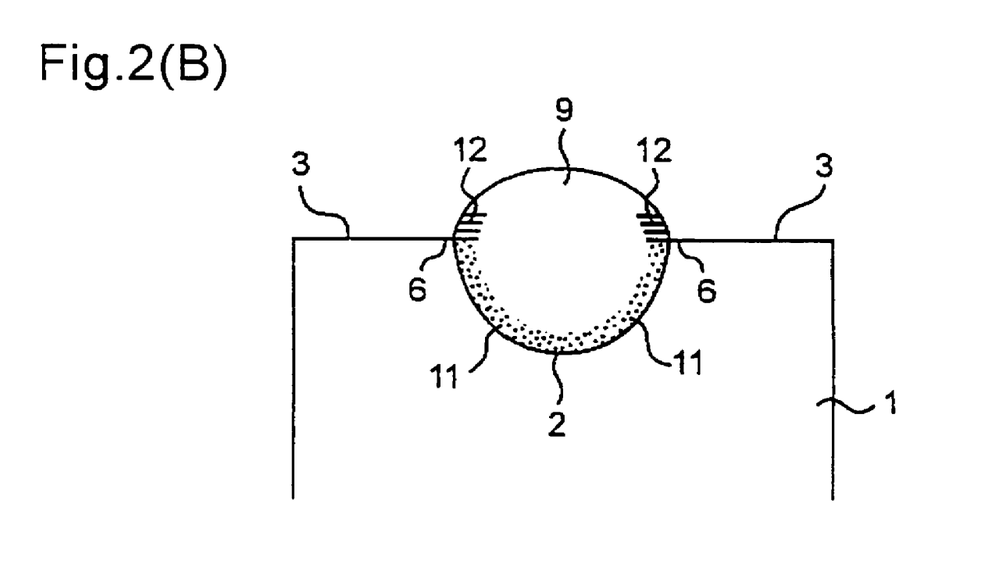
FIG. 2(B) is a schematic cross-sectional view that shows a holding state of dropped glass prior to the pressing process of FIG. 2(A)

In order to carry out the press-molding process while maintaining the space as shown in FIG. 2(A), (2-1) the glass shape immediately before the pressing, (2-2) the timing of the pressing and (2-3) the pressing pressure are appropriately controlled as described below:

(2-1) The glass shape immediately before the pressing is, for example, set to such a shape that, as shown in FIG. 2(B), the inner edge area 6 of the lower-mold circumferential face is not made in contact with molten glass 9, and molten glass is dropped onto the lower mold in a manner so as to maintain such a shape immediately before the pressing process. As shown in FIG. 1(B), a shape in which the outer edge area 5 of the lower-mold molding face is not made in contact with molten glass 9 may be used. Various conditions at the time of dropping are not particularly limited, as long as the above-mentioned shape is maintained immediately before the pressing; and in order to ensure the above-mentioned shape, for example, the viscosity of molten glass to be dropped, the lower-mold temperature and the wettability of the lower mold are effectively adjusted properly in the same ranges as those of the first embodiment.

With respect to (2-2) the timing of the pressing and (2-3) the pressing pressure, these factors are appropriately selected within the same ranges as those of the first embodiment.

(Third Embodiment)

Figure 3A:
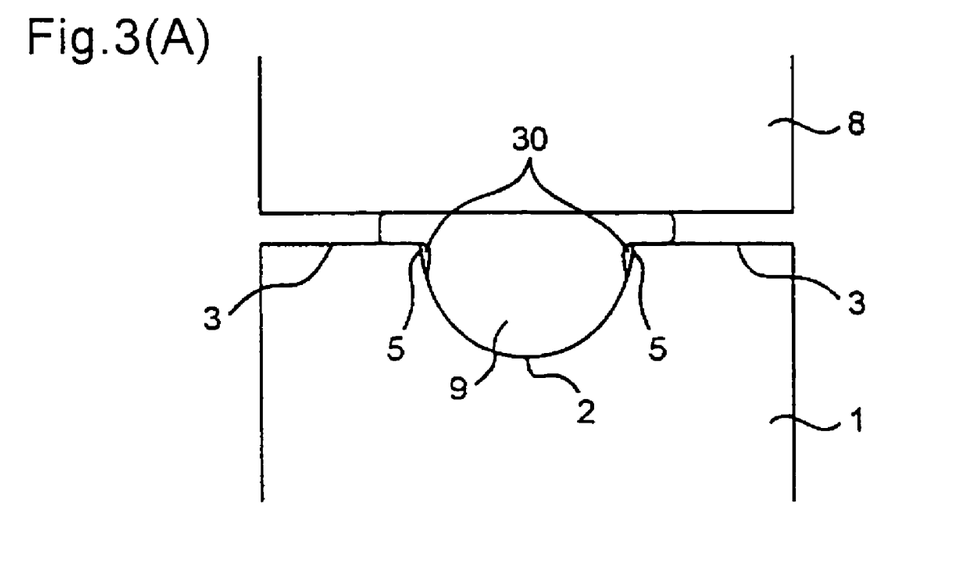
FIG. 3(A) is a schematic cross-sectional view that shows a pressing process in the third embodiment.

As shown in FIG. 3(A), in the third embodiment of the present invention, a pressing process is carried out while maintaining a space 30 between a border area of the molding face 2 and the circumferential face 3 in the lower mold 1 and glass 9. More specifically, the pressing process is carried out while maintaining the space 30 through the entire circumference, between the outer edge area 5 of the molding face 2 (see FIG. 4(A)) and the glass 9. The third embodiment is the same as the first embodiment except that the pressing process is carried out while maintaining the space 30 between the outer edge area 5 of the molding face 2 and the glass 9. In other words, the mechanism and the like by which the space is maintained upon pressing so that the objective of the present invention is achieved are the same as those of the first embodiment.

In order to carry out the pressing while maintaining the space as shown in FIG. 3(A), factors, such as (3-1) the glass shape immediately before the pressing, (3-2) the timing of the pressing and (3-3) the pressing pressure, are appropriately controlled as follows:

With respect to (3-1) the glass shape immediately before the pressing and (3-3) the pressing pressure, these factors are appropriately selected within the same ranges as those of the first embodiment.

With respect to (3-2) the timing of pressing in the present embodiment, this factor is set so that the timing takes place slightly earlier in comparison with the first embodiment. In other words, in the first embodiment (see FIG. 1(A)), the waiting time is maintained until a portion 12 near the border (see FIG. 1(B)), which is comparatively wide in such a degree that a space is formed continuously not only between the outer edge area 5 of the molding face 2 and the glass, but also between the inner edge area 6 of the circumferential face 3 and the glass, has been subjected to an appropriate reduction in fluidity; however, in the present embodiment (see FIG. 3(B), the waiting time is maintained until a portion near the border 12 (see FIG. 3(B), which is comparatively narrow in such a degree that a space is formed only between the outer edge area 5 of the molding face 2 and the glass, has been subjected to an appropriate reduction in fluidity. Since the waiting time of this type is determined depending on the kinds of glass, the quantity of dropped glass and the lower-mold temperature, it is not necessarily determined in a fixed manner; and in the case when glass is LaK8 and a dropping quantity is set to 10 to 200 mg with the lower-mold temperature being set in the above-mentioned range, the waiting time is normally selected appropriately from a range of 2 to 9 seconds, in particular, from a range of 4 to 9 second.

In the first to third embodiments, the tilt angle of the molding face to the circumferential face in the border area between the molding face and the circumferential face of the lower mold is not particularly limited; and for example, it is set in a range from not less than 30° to not more than 90°, in particular, from not less than 40° to not more than 90°. More preferably, it is set in a range from not less than 60° to not more than 90°, in particular, from not less than 60° to not more than 70°. Conventionally, when the tilt angle is not less than 40°, cracks and the like start to occur on the border between the lens portion and the edge portion in the optical glass element, and the occurrence becomes conspicuous in the case of not less than 60°; however, the present invention makes it possible to effectively prevent such problems.

Figure 4B:
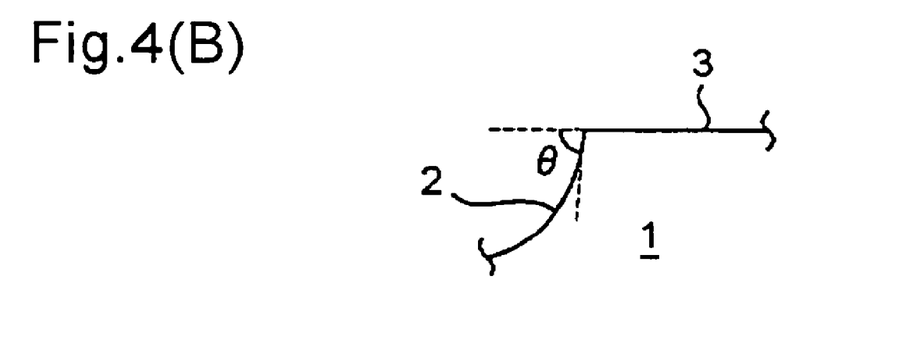
FIG. 4(B) is an enlarged cross-sectional view that shows a border area between a molding face and a circumferential face in FIG. 4(A), which explains a tilt angle.

In the present specification, the tilt angle corresponds to angle θ shown in an enlarged view of the border area in FIG. 4(B).

(Optical Glass Element)

Figure 5A:
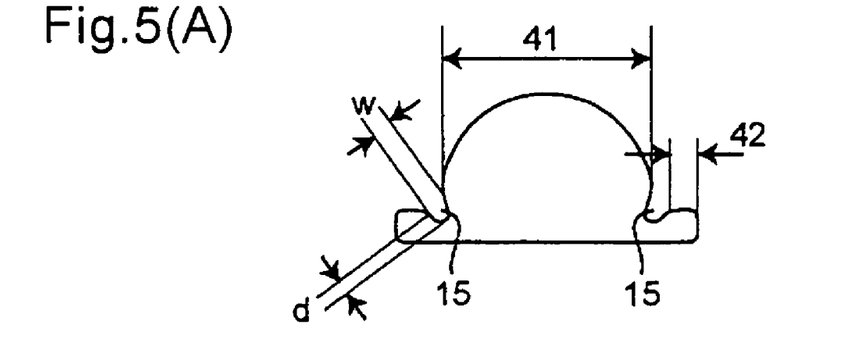
FIGS. 5(A) shows an example of optical glass elements manufactured through the first embodiment.
Figure 5B:
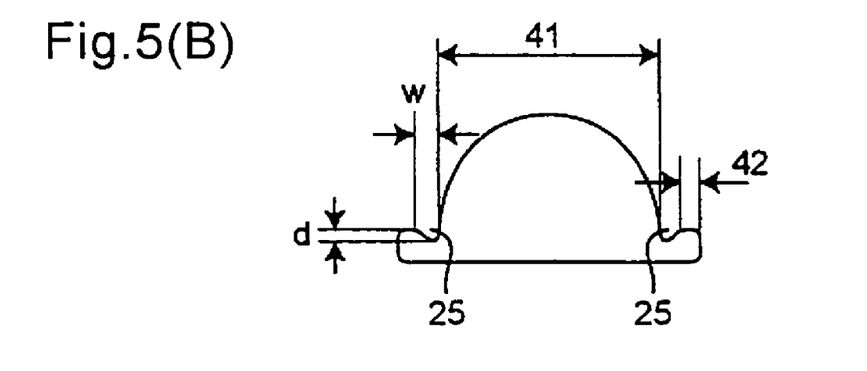
FIGS. 5(B) shows an example of optical glass elements manufactured through the second embodiment.
Figure 5C:
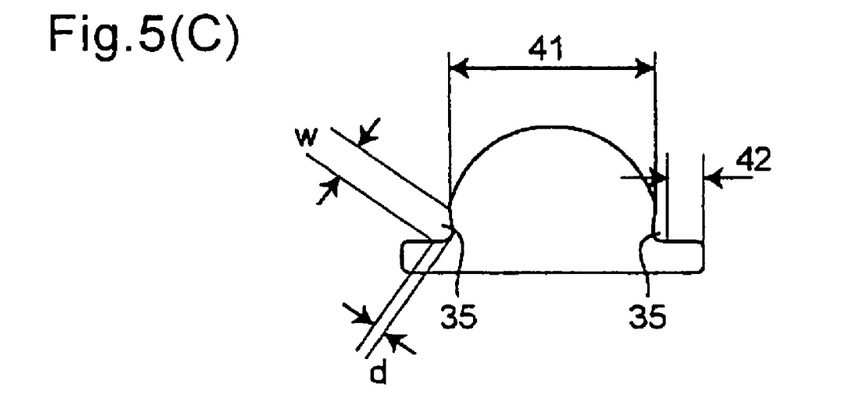
FIGS. 5(C) shows an example of optical glass elements manufactured through the third embodiment.

FIG. 5 shows a specific example of an optical glass element manufactured by the method of the present invention. FIG. 5(A) shows one example of an element manufactured by the first embodiment, FIG. 5(B) shows one example of an element manufactured by the second embodiment, and FIG. 5(C) shows one example of an element manufactured by the third embodiment.

As shown in FIGS. 5(A) to 5(C), each of the optical glass elements, manufactured by the methods of the present invention, has a lens face (optical face) 41 derived from the transferred lower-mold molding face and an edge face 42 derived from the transferred lower-mold circumferential face, and is characterized by a concave section (groove) (15, 25, 35) formed between the lens face 41 and the edge face 42.

The concave sections (15, 25, 35) are respectively derived from the spaces (10, 20, 30), and the size of each of the concave sections is dependent on the size of the space and the use quantity of molten glass. For example, in the case when molten glass of 10 to 200 mg is used, the width w and the depth d (see FIG. 5) of the cross-section of the concave section is also set to a nanometer to millimeter level.

The surface of each of the concave sections (15, 25, 35) forms a free face, and the surface roughness Ra of each concave section is in a range from 1 to 10 nm, preferably in a range from 1 to 5 nm. The lens face 41 of the element is smoothly connected to the concave section (15, 25, 35).

The molding surface is desirably transferred to the lens surface 41. For example, even when the surface roughness Ra of the molding surface is set to about 10 nm, in particular, to a small level of 5 nm, the corresponding shape-forming face is effectively transferred onto the lens surface. At this time, the shape error in the lens surface is set to not more than 0.1 μm, preferably to not more than 0.05 μm. The shape error corresponds to a difference between the molded lens shape and the designed shape.

The difference in thickness between the lens portion (portion having the lens face) and the edge portion (portion having the edge face) of the element is not particularly limited; and for example, in the case of a lens outer diameter approximately in a range of 2 to 6 mm, it may be set in a range of 1 to 3 mm, preferably in a range of 1 to 2 mm. Conventionally, in the case of a difference in thickness of not less than 1 mm, the border between the lens portion and the edge portion in the optical glass element is more susceptible to cracks and the like; however, the present invention effectively prevents such a problem. Normally, the largest thickness in the lens portion (core thickness) is properly set, generally in a range from 1 to 4 mm, more appropriately from 1 to 3 mm. Normally, the thickness in the edge portion is properly set in a range from 0.1 to 1 mm, particularly from 0.1 to 0.7 mm. The above-mentioned numeric values are applied to a lens diameter approximately in a range from 2 to 6 mm, and the present invention is not intended to be limited by these values. In the case when the lens outer diameter differs, the above-mentioned values are appropriately changed virtually in proportion to the size of the outer diameter.

EXAMPLES

The following description will discuss the present invention in detail by reference to examples.

Example 1

Optical glass elements were manufactured by using methods as shown in FIGS. 1(A) and 1(B). The lower mold 1 and the upper mold 8 are made of cemented carbide, and each of the molding face and the circumferential face in the lower mold and the upper mold contact face to glass is subjected to a precision polishing process so as to have a surface roughness Ra of 15 nm. With respect to the molding face concave section of the lower mold 1, the opening diameter is 3.2 mm with a depth of 1.5 mm, and the section has a concave non-spherical shape having an approximate radius of curvature of 1.4 mm. The tilt angle of the molding face 2 of the lower mold with respect to the circumferential face 3 is set to 62°. The temperature of the lower mold 1 and the upper mold 8 was set at 450° C.

More specifically, 70 mg of glass (LaK8), molten at a temperature of 1100° C. in a crucible, not shown, was dropped on the lower-mold molding face through a nozzle heated to 1050° C. so that the diameter of the molten glass droplet has a diameter of 3.1 mm. Upon dropping, the molten glass was once held at the tip of the nozzle, and after having reached a predetermined weight, it was separated from the tip of the nozzle, and allowed to drop downward. The glass viscosity is $10^5$ poise at 1050° C. After dropped, the resulting glass was held in a state shown in FIG. 1(B) for 6 seconds (waiting time). Thereafter, as shown in FIG. 1(A), the glass was quickly pressed by the lower mold 1 and the upper mold 8 at a pressure of 30 kg/cm$^2$ for 5 seconds. After the pressing process, the heating process for the upper and lower molds was finished, and the upper and lower molds were opened and released, and left for one minute so as to be cooled; thus, an optical glass element as shown in FIG. 5(A) was obtained.

When the resulting optical glass element was observed under an optical microscope (magnification:×100), it was found that a concave section (groove) was formed in the border between the lens portion and the edge portion with none of cracks and chips being caused therein. The concave section has a free surface, and was located out of an optical effective area. The width w of the concave. section was 200 μm with a depth d being set to 100 μm.

The outer diameter of the lens portion in the element was 4.0 mm, the core thickness thereof was 2.200 mm, the diameter of the optical effective area was 3.0 mm, and the thickness of the edge portion was 0.5 mm. The surface roughness of both of the faces of the element was 10 nm.

Comparative Example 1

Figure 6:
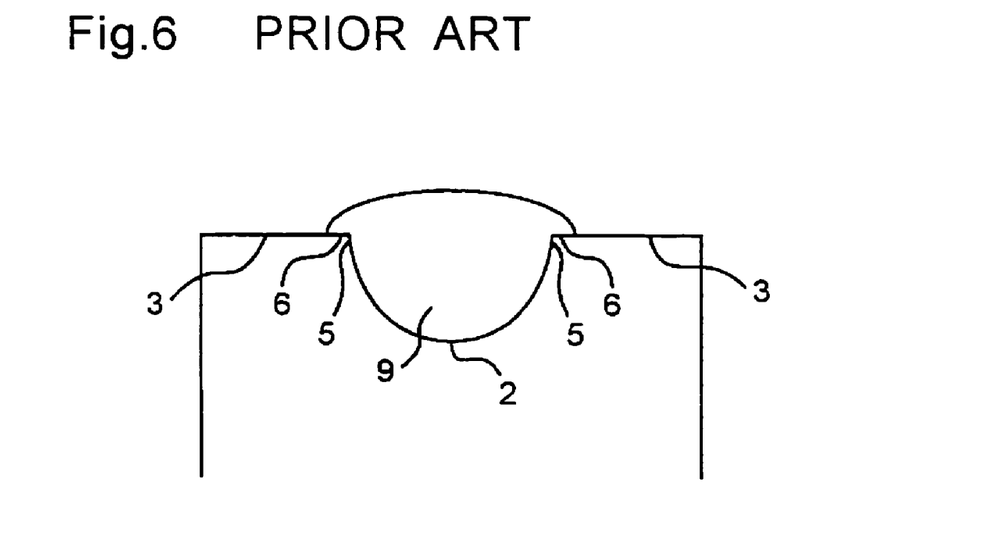
FIGS. 6 is a schematic cross-sectional view that shows dropped glass prior to the pressing process in accordance with a conventional technique.

In this example, 70 mg of molten glass was dropped through a nozzle heated to 1200° C. so that the diameter of the molten glass droplet had a diameter of 3.3 mm. The same processes as those of example 1 were carried out except that the resulting glass was held in a state shown in FIG. 6 for 4 seconds and pressed as shown in FIG. 7 to obtain an optical glass element. In FIG. 6, the outer edge area 5 of the molding face 2 and the inner edge area 6 of the circumferential face 3 were made in contact with glass. The glass viscosity at 1200° C. is $10^1$ poise.

When the resulting optical element was observed under an optical microscope (magnification:×100), it was found that cracks and chips were caused on the border portion between the lens portion and the edge portion.

Example 2

An optical glass element as shown in FIG. 5(B) was obtained by carrying out the same processes as those of example 1, except that 70 mg of molten glass was dropped from a nozzle so that the diameter of the molten glass droplet was set to 3.2 mm and that this was held in a state as shown in FIG. 2(B) for 6 seconds, and then pressed as shown in FIG. 2(A).

When the resulting optical glass element was observed under an optical microscope (magnification:×100), it was found that a concave section (groove) was formed in the border between the lens portion and the edge portion with none of cracks and chips being caused therein. The concave section had a free surface, and was located out of an optical effective area. The width w of the concave section was 200 μm with a depth d being set to 100 μm.

The outer diameter of the lens portion in the element was 4.0 mm, the core thickness thereof was 2.200 mm, the diameter of the optical effective area was 3.0 mm, and the thickness of the edge portion was 0.5 mm. The surface roughness of both of the faces of the element was 10 nm.

Example 3

Figure 3B:
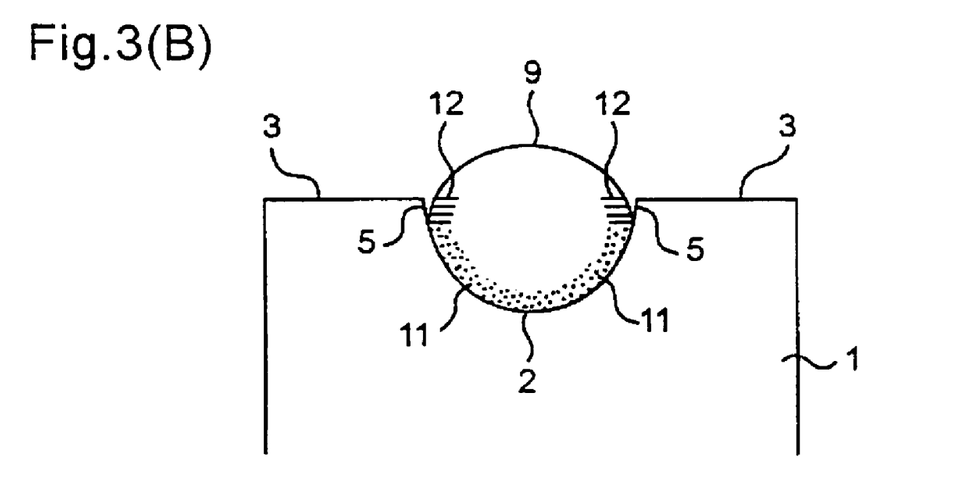
FIG. 3(B) is a schematic cross-sectional view that shows a holding state of dropped glass prior to the pressing process of FIG. 3(A)

An optical glass element as shown in FIG. 5(C) was obtained by carrying out the same processes as those of example 1, except that 70 mg of molten glass was dropped from a nozzle so that the diameter of the molten glass droplet was set to 3.0 mm and that this was held in a state as shown in FIG. 3(B) for 5.5 seconds, and then pressed as shown in FIG. 3(A).

When the resulting optical glass element was observed under an optical microscope (magnification:×100), it was found that a concave section (groove) was formed in the border between the lens portion and the edge portion with none of cracks and chips being caused therein. The concave section had a free surface, and was located out of an optical effective area. The width w of the concave section was 200 μm with a depth d being set to 100 μm.

The outer diameter of the lens portion in the element was 4.0 mm, the core thickness thereof was 2.200 mm, the diameter of the optical effective area was 3.0 mm, and the thickness of the edge portion was 0.5 mm. The surface roughness of both of the faces of the element was 10 nm.

What is claimed is:

1. A manufacturing method for an optical glass element having an optical face and an edge face that is a circumferential portion of the optical face, comprising
dropping a molten glass material on a lower mold which has a molding face used for transferring the optical face and a circumferential face that is adapted for transferring the edge face, and
pressing the molten glass material between the lower mold and an upper mold so that the molten glass material comes in contact with at least a portion of the circumferential face, wherein pressing the molten glass material comprises maintaining a space between the molten glass material and a border area of the molding face and the circumferential face, wherein the border area of the molding face and the circumferential face includes an outer edge area of the molding face and an inner edge area of the circumferential face.

2. The manufacturing method for an optical glass element according to claim 1, wherein the pressing process is carried out with a space being maintained between an outer edge area of the lower-mold molding face and/or an inner edge area of the lower-mold circumferential face and the glass.

3. The manufacturing method for an optical glass element according to claim 1, wherein, in the border area of a molding face and a circumferential face in the lower mold, the molding face has a tilt angle in a range from not less than 40° to not more than 90° with respect to the circumferential face.

4. The manufacturing method for an optical glass element according to claim 1 wherein a viscosity of the molten glass material is within a range from $10^3$ to $10^7$ poise.

5. A manufacturing method for an optical glass element having an optical face and an edge face that is a circumferential portion of the optical face, comprising:
dropping a molten glass material on a lower mold which has a molding face used for transferring the optical face and a circumferential face used for transferring the edge face in such a manner that the dropped glass material is not made in contact with the circumferential face;
waiting until the dropped glass material has reached a predetermined viscosity; and pressing the glass material between the lower mold and the upper mold in such a manner that the glass material is made in contact with at least a portion of the circumferential face but is not made in contact with an inner edge area of the circumferential face that is located in a border area between the molding face and the circumferential face of the lower mold.

6. The manufacturing method for an optical glass element according to claim 5, wherein, in the border area of a molding face and a circumferential face in the lower mold, the molding face has a tilt angle in a range from not less than 40° to not more than 90° with respect to the circumferential face.

7. The manufacturing method for an optical glass element according to claim 5, wherein a dropping quantity of the molten glass material is set to 10 to 200 mg and a viscosity of the molten glass material is within a range from $10^3$ to $10^7$ poise.

8. The manufacturing method for an optical glass element according to claim 5, wherein a surface roughness of the lower-mold molding face is within a range from 10 to 50 nm in Ra.

9. The manufacturing method for an optical glass element according to claim 5 wherein a viscosity of the molten glass material is within a range from $10^3$ to $10^7$ poise.

10. A manufacturing method for an optical glass clement having an optical face and an edge face that is a circumferential portion of the optical face, comprising:
    dropping a molten glass material on a lower mold which has a molding face used for transferring the optical face and a circumferential face used for transferring the edge face in such a manner that the dropped glass material is not made in contact with an outer edge area of the lower-mold molding face;
    waiting until the dropped glass material has reached a predetermined viscosity; and
    pressing the glass material in such a manner that, between the lower mold and the upper mold, the glass material is made in contact with the circumferential face and an optical molding face that is used for transferring an optical effective area of the optical face within the lower-mold molding face, while the glass material is not made in contact with an outer edge area of the molding face that corresponds to a portion out of the optical effective area of the optical face.

11. The manufacturing method for an optical glass element according to claim 10, comprising:
    pressing the glass material in such a manner that the glass material is not made in contact with an inner edge area of the circumferential face that is located in a border area between the molding face and the circumferential face of the lower mold.

12. The manufacturing method for an optical glass element according to claim 10, wherein, in the border area of a molding face and a circumferential face in the lower mold, the molding face has a tilt angle in a range from not less than 40° to not more than 90° with respect to the circumferential face.

13. The manufacturing method for an optical glass element according to claim 10, wherein a dropping quantity of the molten glass material is set to 10 to 200 mg and a viscosity of the molten glass material is within a range from $10^3$ to $10^7$ poise.

14. The manufacturing method for an optical glass element according to claim 10, wherein a surface roughness of the lower-mold molding face is within a range from 10 to 50 nm in Ra.

15. The manufacturing method for an optical glass element according to claim 10 wherein a viscosity of the molten glass material is within a range from $10^3$ to $10^7$ poise.

* * * * *